United States Patent
Franklin

(10) Patent No.: US 9,551,230 B2
(45) Date of Patent: Jan. 24, 2017

(54) FRICTION WELDING ROTOR BLADES TO A ROTOR DISK

(71) Applicant: United Technologies Corporation, Hartford, CT (US)

(72) Inventor: Jordan J. Franklin, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/622,344

(22) Filed: Feb. 13, 2015

(65) Prior Publication Data

US 2016/0237834 A1    Aug. 18, 2016

(51) Int. Cl.
| | |
|---|---|
| *B23K 20/12* | (2006.01) |
| *F01D 5/30* | (2006.01) |
| *F01D 5/00* | (2006.01) |
| *F01D 5/02* | (2006.01) |
| *F04D 29/32* | (2006.01) |
| *F04D 29/64* | (2006.01) |
| *F01D 5/34* | (2006.01) |

(52) U.S. Cl.
CPC ......... *F01D 5/3061* (2013.01); *B23K 20/1205* (2013.01); *B23K 20/129* (2013.01); *F01D 5/005* (2013.01); *F01D 5/02* (2013.01); *F01D 5/34* (2013.01); *F04D 29/322* (2013.01); *F04D 29/644* (2013.01); *B23K 2201/001* (2013.01); *F05D 2220/323* (2013.01); *F05D 2220/36* (2013.01); *F05D 2230/232* (2013.01); *F05D 2230/236* (2013.01); *F05D 2230/239* (2013.01); *F05D 2240/30* (2013.01)

(58) Field of Classification Search
None
See application file for complete search history.

(56) References Cited

U.S. PATENT DOCUMENTS

| | | | | |
|---|---|---|---|---|
| 2,773,169 | A * | 12/1956 | Lees ................... | B23K 11/002 219/137 R |
| 4,143,536 | A * | 3/1979 | Okamoto ............... | B63H 1/28 219/153 |
| 4,406,584 | A * | 9/1983 | Stepp ..................... | F03D 7/06 416/119 |
| 5,148,957 | A * | 9/1992 | Searle ................ | B23K 20/1205 228/2.1 |
| 5,188,275 | A * | 2/1993 | Daines ............... | B23K 20/1205 228/2.1 |
| 5,197,190 | A * | 3/1993 | Coolidge ................ | B23P 6/005 228/119 |

(Continued)

FOREIGN PATENT DOCUMENTS

| | | | | |
|---|---|---|---|---|
| CA | 2738369 | A1 * | 4/2010 | ........... B23P 15/006 |
| EP | 0624420 | A2 * | 11/1994 | ........... B23K 20/129 |
| GB | 2463036 | A * | 3/2010 | ........... F01D 11/008 |

OTHER PUBLICATIONS

Extended EP Search Report dated Jul. 13, 2016.

*Primary Examiner* — Kiley Stoner
(74) *Attorney, Agent, or Firm* — O'Shea Getz P.C.

(57) ABSTRACT

Systems and methods are provided related to manufacturing, repairing or otherwise providing an integrally bladed rotor. In one method, a set of preform rotor blades are arranged relative to a rotor disk. The preform rotor blades are concurrently bonded to the rotor disk.

16 Claims, 11 Drawing Sheets

(56) References Cited

U.S. PATENT DOCUMENTS

| | | | | |
|---|---|---|---|---|
| 5,244,345 | A * | 9/1993 | Curtis | F01D 11/008 416/193 A |
| 5,366,344 | A * | 11/1994 | Gillbanks | B23K 20/1205 228/112.1 |
| 5,468,334 | A * | 11/1995 | Searle | B23K 20/1205 156/580 |
| 5,518,562 | A * | 5/1996 | Searle | B23K 20/129 156/580 |
| 5,813,593 | A * | 9/1998 | Galaske, Jr. | B23K 20/1205 228/112.1 |
| 5,865,364 | A * | 2/1999 | Trask | B23K 20/1205 228/112.1 |
| 6,095,402 | A * | 8/2000 | Brownell | B23K 20/1205 228/112.1 |
| 6,106,233 | A * | 8/2000 | Walker | B23K 20/1205 228/112.1 |
| 6,219,916 | B1 * | 4/2001 | Walker | B23K 20/1205 29/889.21 |
| 6,326,585 | B1 * | 12/2001 | Aleshin | B23K 26/032 219/121.63 |
| 6,478,545 | B2 * | 11/2002 | Crall | B23K 20/129 29/889.1 |
| 6,542,843 | B1 * | 4/2003 | Metzinger | B23P 6/002 702/113 |
| 7,722,330 | B2 * | 5/2010 | Seth | B21K 1/36 416/223 A |
| 7,735,223 | B2 * | 6/2010 | Clark | B23K 20/1205 228/112.1 |
| 7,841,834 | B1 * | 11/2010 | Ryznic | B23P 6/005 416/224 |
| 8,266,800 | B2 * | 9/2012 | Segletes | F01D 5/005 29/402.06 |
| 8,360,302 | B2 * | 1/2013 | Richter | B23K 13/015 228/112.1 |
| 8,479,391 | B2 * | 7/2013 | Chin | B23K 20/1205 228/112.1 |
| 8,613,138 | B2 * | 12/2013 | Chin | B23K 20/1205 228/112.1 |
| 2002/0127108 | A1 * | 9/2002 | Crall | B23K 20/129 416/213 R |
| 2003/0042293 | A1 * | 3/2003 | Ezumi | B23K 20/122 228/112.1 |
| 2003/0098335 | A1 * | 5/2003 | Saeki | B23K 20/1255 228/112.1 |
| 2003/0223873 | A1 * | 12/2003 | Carrier | F01D 5/3061 416/213 R |
| 2004/0005219 | A1 * | 1/2004 | Phipps | F01D 5/02 416/219 R |
| 2004/0083024 | A1 * | 4/2004 | Wang | B23P 6/002 700/195 |
| 2005/0098608 | A1 * | 5/2005 | Adde | B23K 20/1205 228/112.1 |
| 2005/0274010 | A1 * | 12/2005 | Rawson | B23K 20/1205 29/889.1 |
| 2006/0231593 | A1 * | 10/2006 | Bayer | B23K 20/1205 228/112.1 |
| 2006/0266801 | A1 * | 11/2006 | Tonks | B23K 20/021 228/101 |
| 2006/0278685 | A1 * | 12/2006 | Bamberg | B23K 20/1205 228/114.5 |
| 2008/0016688 | A1 * | 1/2008 | Fabre | B23K 20/129 29/889.21 |
| 2008/0107531 | A1 * | 5/2008 | Chou | B23K 20/129 416/213 R |
| 2008/0107532 | A1 * | 5/2008 | Carrier | B23K 20/129 416/213 R |
| 2008/0112809 | A1 * | 5/2008 | Corral Garcia | F01D 5/045 416/189 |
| 2008/0244905 | A1 * | 10/2008 | Meier | B23K 26/24 29/889.1 |
| 2009/0108051 | A1 * | 4/2009 | Bamberg | B23K 20/1205 228/112.1 |
| 2009/0113708 | A1 * | 5/2009 | Bamberg | B23K 20/1205 29/889.21 |
| 2009/0134138 | A1 * | 5/2009 | Athey | B23K 20/1205 219/162 |
| 2010/0284817 | A1 * | 11/2010 | Bamberg | B23K 15/0046 416/241 R |
| 2011/0129353 | A1 * | 6/2011 | Knott | B23K 1/0018 416/241 R |
| 2011/0138624 | A1 * | 6/2011 | Chin | B23K 20/1205 29/889.1 |
| 2011/0138625 | A1 * | 6/2011 | Chin | B23K 20/1205 29/889.1 |
| 2011/0305578 | A1 * | 12/2011 | Smarsly | B23K 20/1205 416/223 R |
| 2012/0022678 | A1 * | 1/2012 | Bray | B23K 20/1205 700/104 |
| 2012/0027603 | A1 * | 2/2012 | Gindorf | B23K 11/02 416/213 R |
| 2012/0099998 | A1 * | 4/2012 | Moor | B23K 20/1205 416/213 R |
| 2012/0121437 | A1 * | 5/2012 | Borufka | F01D 5/22 416/97 R |
| 2012/0181324 | A1 * | 7/2012 | Yamauchi | B23K 20/124 228/114 |
| 2012/0280021 | A1 * | 11/2012 | Stiehler | B23K 20/129 228/114.5 |
| 2014/0041223 | A1 * | 2/2014 | Wojciechowski | F01D 5/005 29/889.1 |
| 2014/0325842 | A1 * | 11/2014 | Johnson | B23K 20/1205 29/889.21 |
| 2016/0076376 | A1 * | 3/2016 | Trickey | F01D 5/005 228/114 |

\* cited by examiner

FRICTION WELDING ROTOR BLADES TO A ROTOR DISK

BACKGROUND OF THE INVENTION

1. Technical Field

This disclosure relates generally to an integrally bladed rotor and, more particularly, to friction welding rotor blades to a rotor disk.

2. Background Information

An integrally bladed rotor includes a rotor disk and a plurality of rotor blades. The rotor blades are disposed around and may be bonded to or formed integral with the rotor disk. In one bonding method, each rotor blade is individually linear friction welded to the rotor disk. Such a method, however, may be time consuming and expensive since each blade is welded to the rotor disk in a separate and discrete step.

There is a need in the art for improved methods and systems for welding rotor blades to a rotor disk in manufacture and repair of integrally bladed rotors.

SUMMARY OF THE DISCLOSURE

According to an aspect of the invention, a method for providing an integrally bladed rotor is provided. This method includes arranging a set of preform rotor blades relative to a rotor disk. The preform rotor blades are then concurrently welded to the rotor disk.

According to another aspect of the invention, a method is provided for manufacturing an integrally bladed rotor for a turbine engine. This manufacturing method includes arranging a set of preform rotor blades relative to a rotor disk. The preform rotor blades are then welded to the rotor disk. The welding includes: oscillating the preform rotor blades relative to the rotor disk along a weld plane; and pressing the oscillating preform rotor blades against the rotor disk.

According to still another aspect of the invention, a method is provided for repairing an integrally bladed rotor for a turbine engine. This repair method includes arranging a set of preform rotor blades relative to a rotor disk. The preform rotor blades are then welded to the rotor disk. The welding includes: oscillating the preform rotor blades relative to the rotor disk along a weld plane; and pressing the oscillating preform rotor blades against the rotor disk.

According to still another aspect of the invention, a method for providing an integrally bladed rotor for a turbine engine is provided. The method includes arranging a set of preform rotor blades relative to a rotor disk, wherein the preform rotor blades are interconnected by at least one collar. The preform rotor blades are concurrently bonded to the rotor disk. Excess material is machined from at least the bonded preform rotor blades to respectively form a set of blades for the turbine engine.

The welding may be or include linear friction welding and/or any other welding process.

The weld plane may be planar or parti-cylindrical.

The method may include machining excess material from at least the welded preform rotor blades to respectively form a set of rotor blades.

The method may include at least partially removing a set of rotor blades from the rotor disk prior to the arranging of the preform rotor blades relative to the rotor disk. The preform rotor blades may be respectively welded to the rotor disk at locations from which the rotor blades were disposed before being removed.

The preform rotor blades may be interconnected by a collar.

The collar may be formed as a unitary body with the preform rotor blades.

The collar may include a plurality of collar segments. Each of the collar segments may be formed as a unitary body with a respective one of the preform rotor blades. An adjacent pair of the collar segments may be bonded together. In addition or alternatively, the adjacent pair of the collar segments may be mechanically joined together.

The collar may include a gripping feature.

Each of the preform rotor blades may be formed integral with a respective one of a plurality of collars. The collars may be interconnected by a fixture used to hold and move the preform rotor blades during the (e.g., linear friction) welding.

The rotor disk may include a set of preform rotor blade bases to which the preform rotor blades are respectively (e.g., linear friction) welded.

The (e.g., linear friction) welding may include: holding the rotor disk stationary; oscillating the preform rotor blades along a weld plane; and pressing the oscillating preform rotor blades against the stationary rotor disk.

The method may include machining excess material from at least the welded preform rotor blades to respectively form a set of rotor blades.

The rotor blades may be configured as compressor blades for a turbine engine. Alternatively, the rotor blades may be configured as turbine blades for a turbine engine. Alternatively, the rotor blades may be configured as fan blades for a turbine engine.

The foregoing features and the operation of the invention will become more apparent in light of the following description and the accompanying drawings.

DETAILED DESCRIPTION OF THE INVENTION

Figure 1:
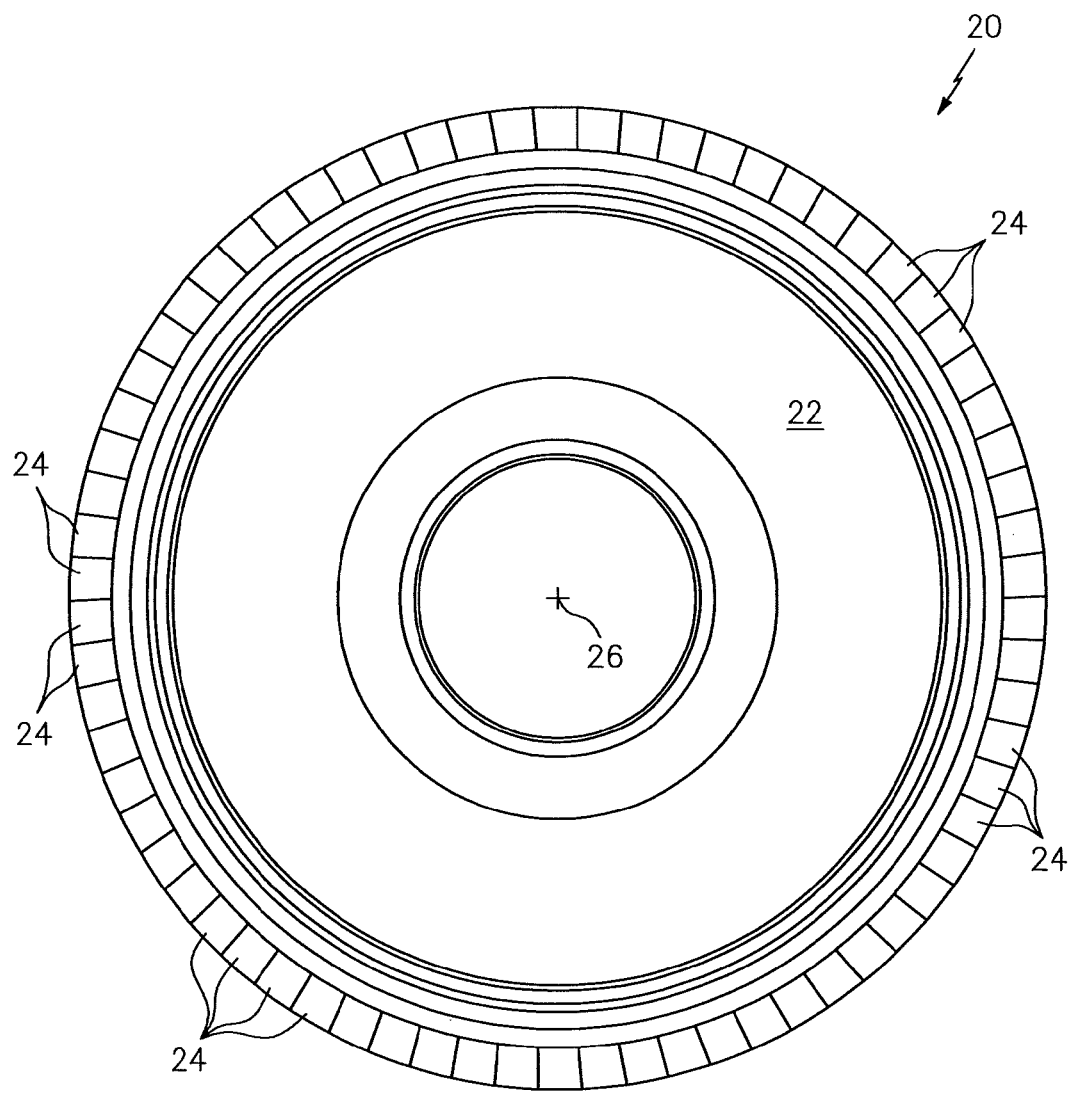
FIG. 1 is an illustration of an integrally bladed rotor (IBR).

The present invention includes systems and methods for manufacturing, repairing or otherwise providing an integrally bladed rotor (IBR). An exemplary integrally bladed rotor 20 is illustrated in FIG. 1. For ease of description, this rotor 20 is described below as an integrally bladed rotor for a turbine engine. However, such a rotor may alternatively be configured for various other types of rotary machines such as, but not limited to, wind turbines, water turbines, propeller systems, etc.

The rotor 20 includes a rotor disk 22 and a plurality of rotor blades 24; e.g., airfoils. The rotor blades 24 may be configured as compressor blades, turbine blades or fan blades. The rotor blades 24 are arranged circumferentially around a rotational axis 26 of the rotor disk 22. The rotor blades 24 are integrally connected with a radial outer peripheral portion of the rotor disk 22. In particular, some or all of the rotor blades 24 or outer portions thereof are friction welded (e.g., linear friction welded) to the rotor disk 22 using methods as described below. One or more of the rotor blades 24 may alternatively, of course, be formed (e.g., cast, forged, machined) integral with the rotor disk 22 where, for example, the friction welding methods described below are utilized to repair a worn or damaged integrally bladed rotor.

The rotor 20 may be manufactured or repaired by concurrently friction welding a set of two, three, four or more preform rotor blades to a rotor disk; e.g., the rotor disk 22. The term "preform rotor blade" may describe a partially formed rotor blade or outer portion of a rotor blade. A rotor blade or rotor blade portion may be considered "partially formed" where it has a general rotor blade configuration (e.g., shape, cooling features, etc.), but requires additional machining, heat treating, finishing and/or other material manipulation processes. A rotor blade or rotor blade portion may also be considered "partially formed" where it includes additional features such as, but not limited to, collar(s), weld constant(s), etc. for use in friction welding that rotor blade or rotor blade portion to a rotor disk, which features may later be removed.

Figure 2:
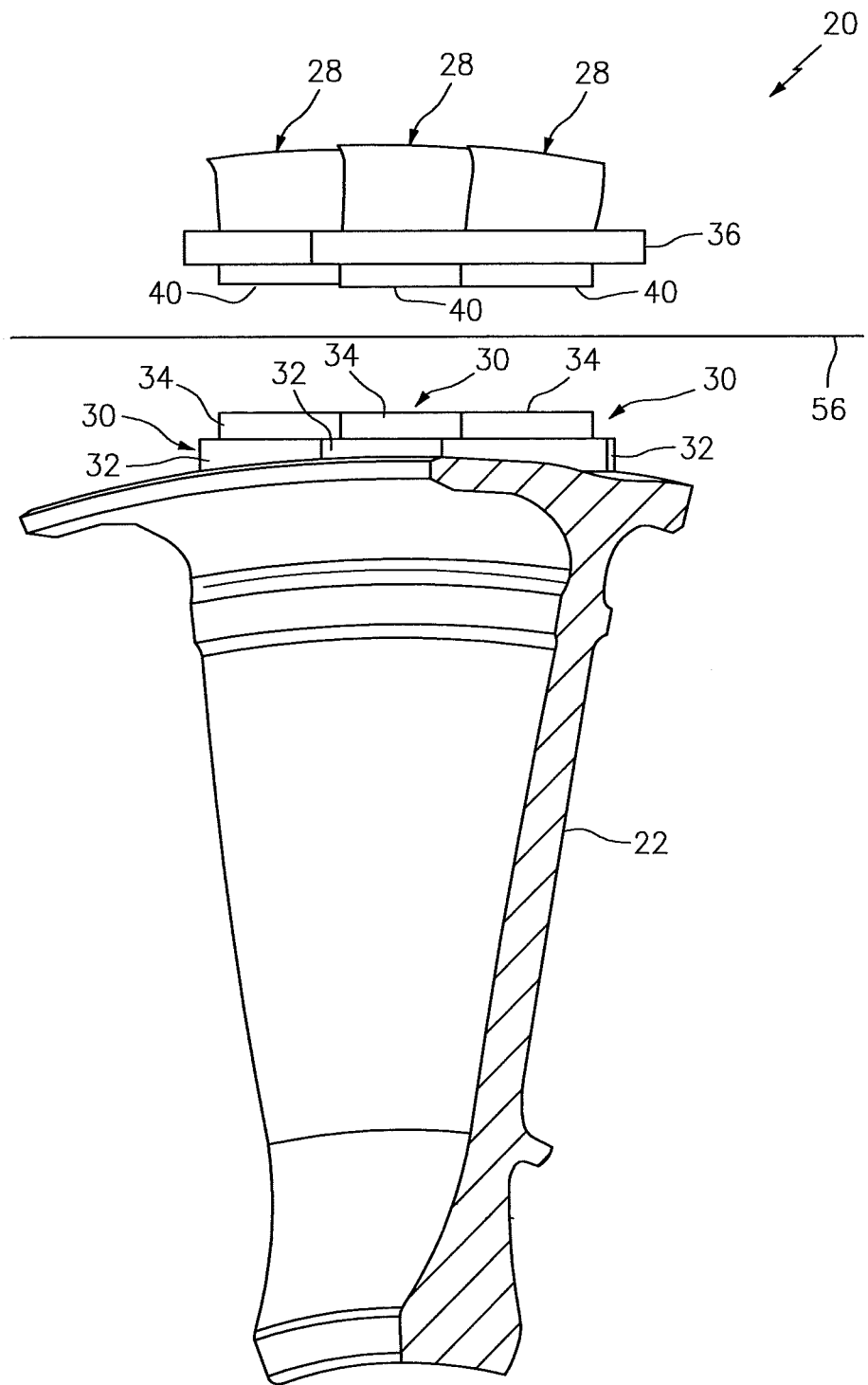
FIG. 2 is a perspective illustration of a set of preform rotor blades arranged next to a rotor disk, only a portion of which is illustrated.

FIG. 2 illustrates an exemplary set of preform rotor blades 28 arranged next to the rotor disk 22, which includes a corresponding set of preform rotor blade bases 30. These preform rotor blade bases 30 may be integrally formed with the rotor disk 22. Each of the preform rotor blade bases 30 includes a rotor stub 32 and weld constant 34. The rotor stub 32 extends radially out from the rotor disk 22 to the weld constant 34. The weld constant 34 may have approximately the same geometry as a similarly situated portion of one of the rotor blades 24; see FIG. 1. The weld constant 34 extends radially out from the rotor stub 32.

Figure 3:
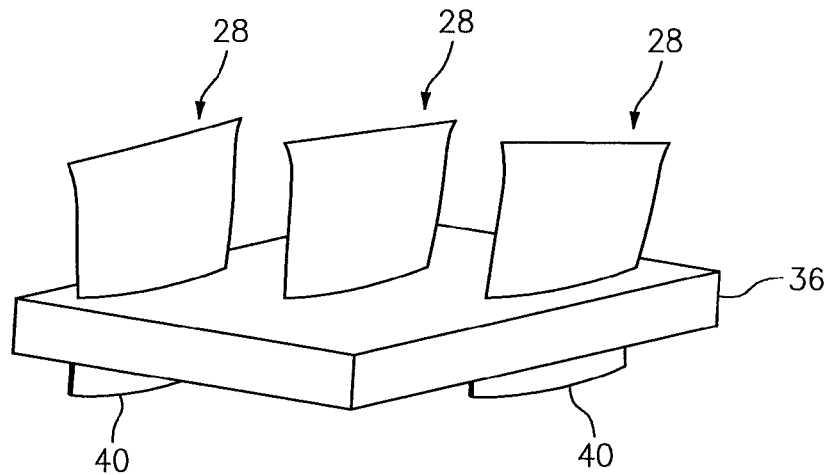
FIGS. 3-6 are perspective illustrations of different sets of preform rotor blades.
Figure 4:
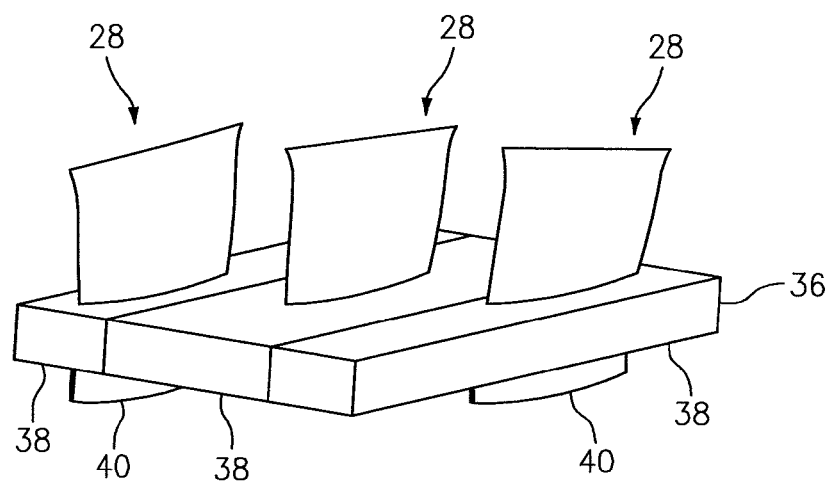
Figure 5:
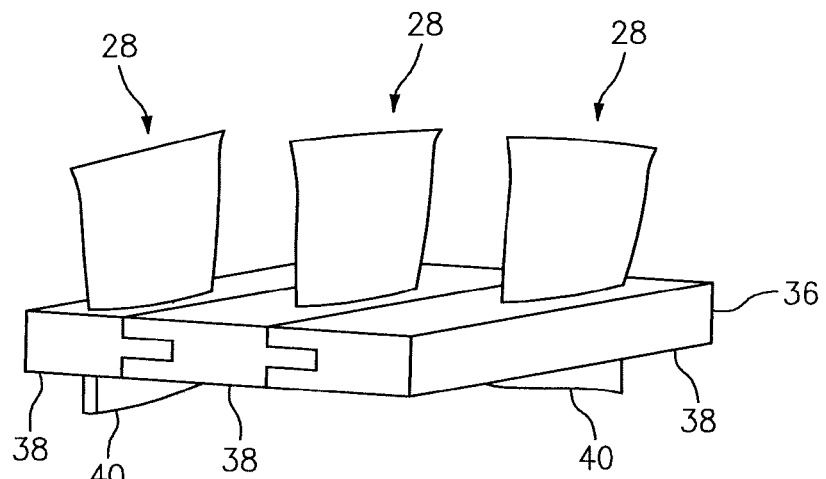
Figure 6:
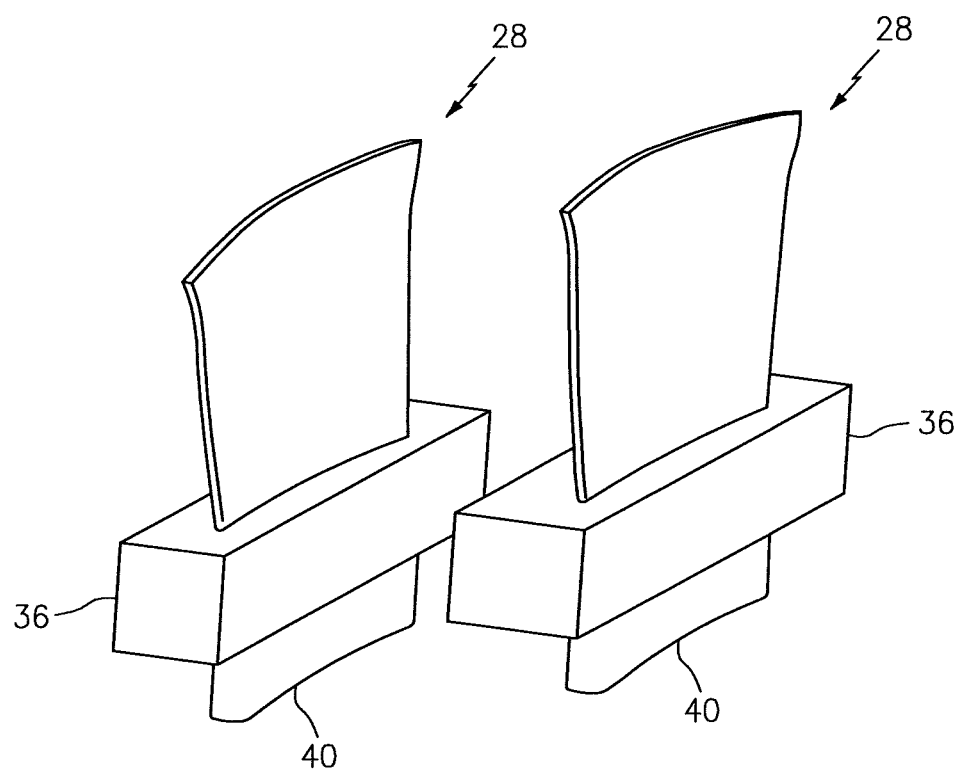

The preform rotor blades 28 are integrally connected (e.g., cast, forged and/or machined integral) with a single collar 36; see also FIG. 3. However, in other embodiments as shown in FIGS. 4-6, one or more of the preform rotor blades 28 may each be integrally connected with a respective collar segment 38 (see FIGS. 4 and 5) or its own discrete collar 36 (see FIG. 6). Referring again to FIG. 2, each of the preform rotor blades 28 includes a weld constant 40. The weld constant 40 may have approximately the same geometry as a similarly situated portion of one of the rotor blades 24 (see FIG. 1) as well as a corresponding one of the weld constants 34. The weld constant 40 extends radially inward from the collar 36.

Each of the weld constants 40 is operable to engage a corresponding one of the weld constants 34 on the rotor disk 22, or the rotor disk 22 itself, in such a fashion so as to friction weld the preform rotor blades 28 to the rotor disk 22 (e.g., see FIG.). For example, the weld constants 36 and 40 may melt and combine together during the friction welding. At least a portion of the melted and combined weld constants 36 and 40 may create weld flash, which may flow out between the collar(s) 36 and the rotor stubs 32. Material of the collars 36 and the rotor stubs 32 may also melt and combine together during the friction welding. Subsequent to the friction welding, the welded preform rotor blades 28 (e.g., the collar(s), weld constant flash, etc.) and/or the preform rotor blade bases 30 (e.g., the stubs, weld flash, etc.) may be further machined and/or otherwise finished and/or manipulated to provide the rotor blades 24 of FIG. 1.

Figure 7:
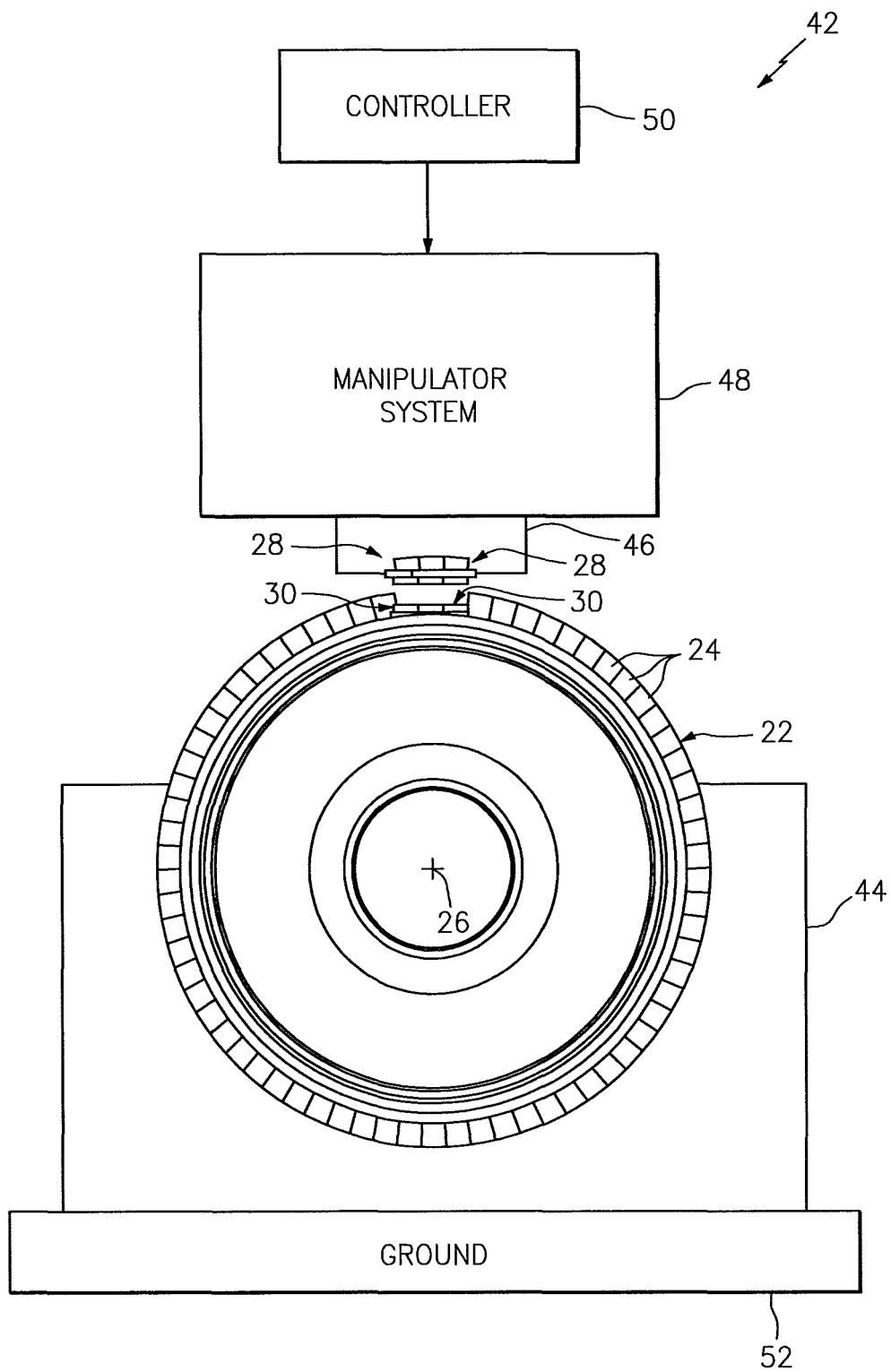
FIG. 7 is a block diagram of a system for friction welding a set of preform rotor blades to a rotor disk.

FIG. 7 illustrates a system 42 for friction welding (e.g., linear friction welding) at least one set of two, three, four or more preform rotor blades 28 to a rotor disk 22. This system 42 includes a rotor disk fixture 44, a rotor blade fixture 46, a manipulator (e.g., oscillator) system 48 and a controller 50.

The rotor disk fixture 44 is configured to securely hold the rotor disk 22 during friction welding. The rotor disk fixture 44 may secure the rotor disk 22 to a ground 52 such that the rotor disk 22 is held stationary during friction welding. However, the rotor disk fixture 44 may be configured to adjust spatial orientation of the rotor disk 22 before, during and/or after a friction welding step. The rotor disk fixture 44, for example, may be configured to rotate the rotor disk 22 about its rotational axis 26. Of course, the present disclosure is not limited to any particular rotor disk fixture 44 types or configurations.

Figure 8:
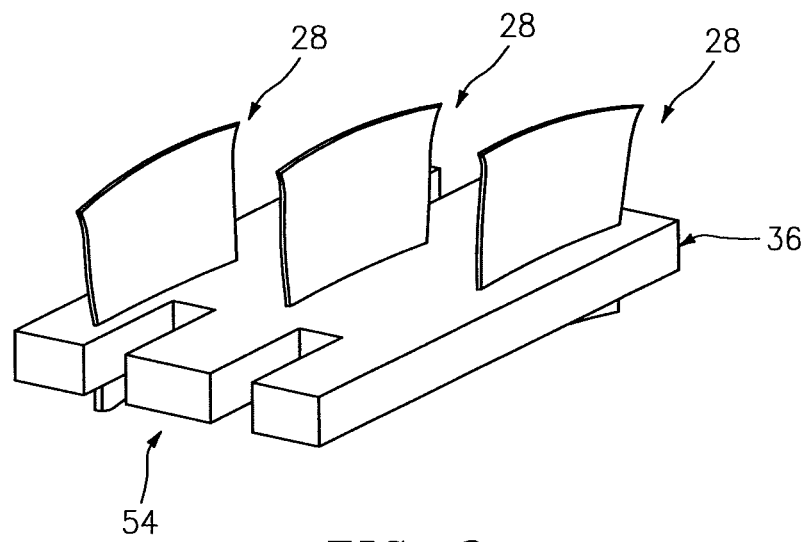
FIGS. 8 and 9 are illustrations of another set of preform rotor blades.
Figure 9:
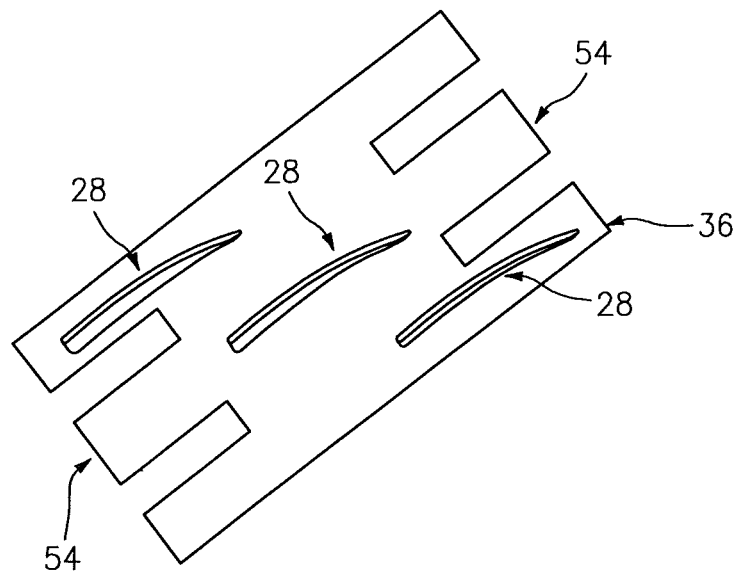

The rotor blade fixture 46 is configured to securely hold a set of preform rotor blades 28 during friction welding. The rotor blade fixture 46, for example, may clamp onto opposing portions of the collar 36. Alternatively, the rotor blade fixture 46 may clamp onto a gripping feature 54 such as, for example, a protrusion that extends out from the collar 36 or formed in the collar 36 as illustrated in FIGS. 8 and 9. Referring again to FIG. 7, the rotor blade fixture 46 may secure the preform rotor blades 28 to the manipulator system 48.

Figure 10:
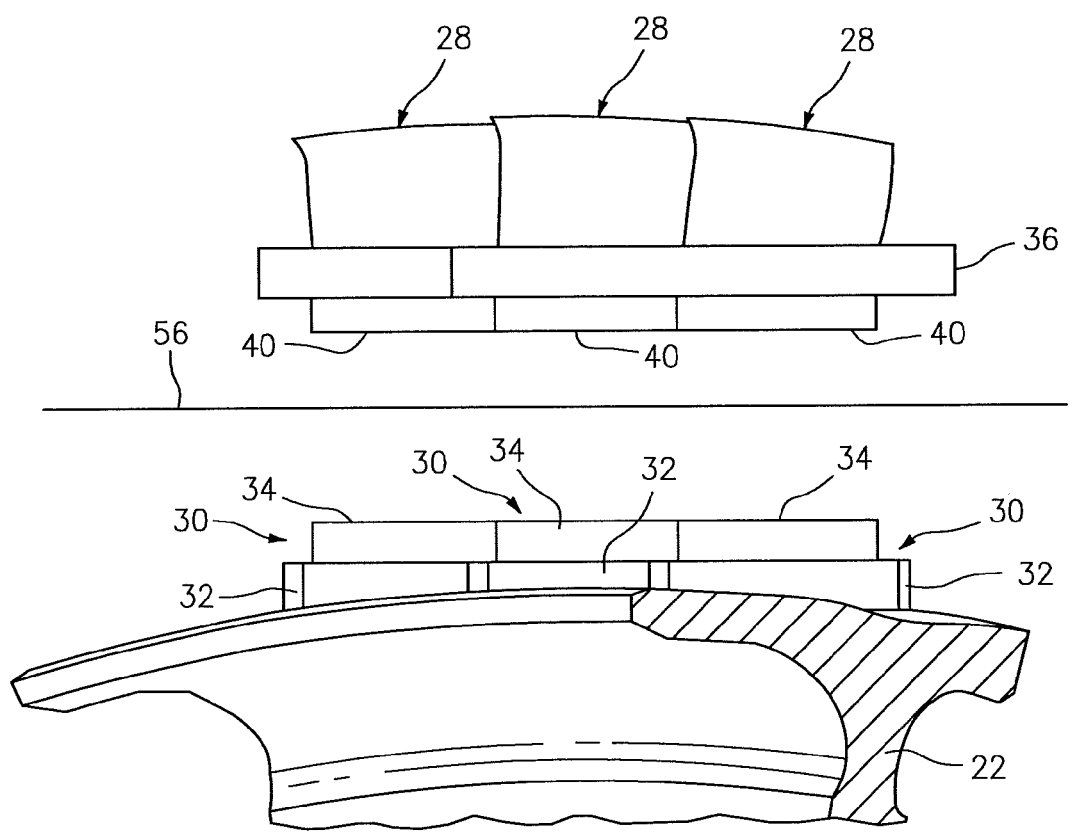
FIG. 10 is an illustration of a portion of the preform rotor blades and the rotor disk of FIG. 2.
Figure 11:
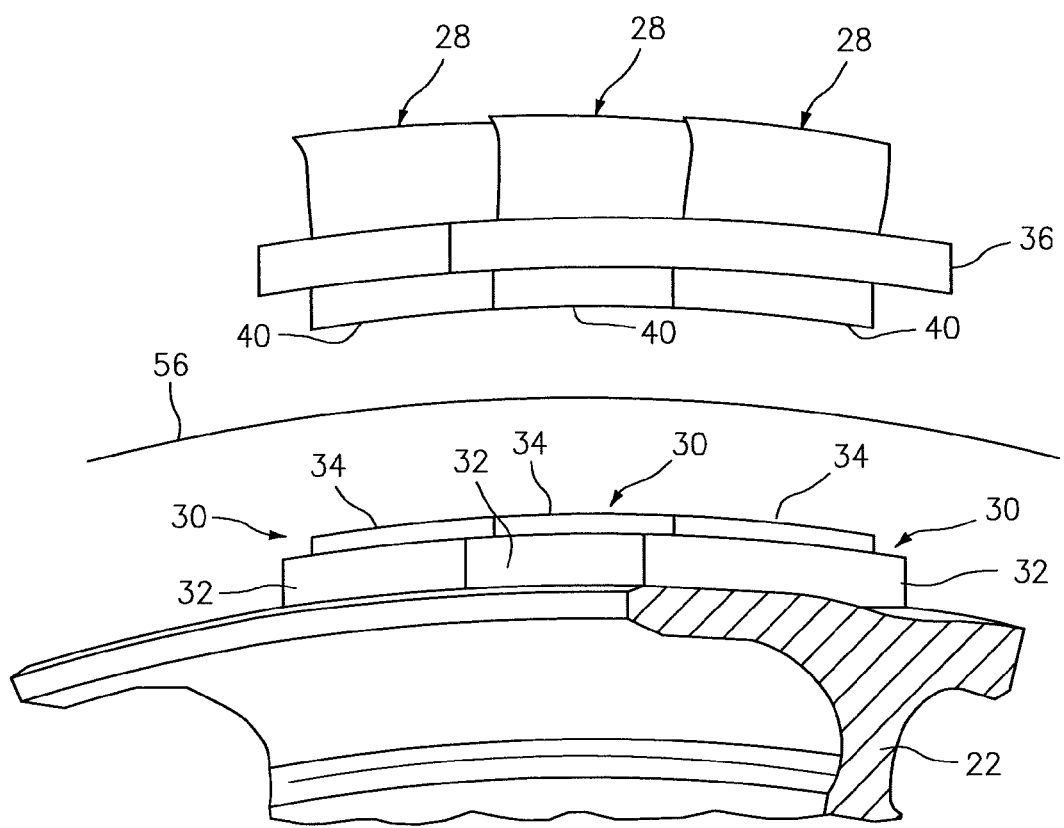
FIG. 11 is an illustration of a portion of another set of preform rotor blades arranged next to a rotor disk.

The manipulator system 48 is configured to move the preform rotor blades 28 relative to the rotor disk 22. The manipulator system 48, for example, may oscillate the preform rotor blades 28 back and forth (e.g., linearly) along a weld plane 56 (see FIG. 2). This weld plane 56 may be planar as illustrated in FIG. 10 or parti-cylindrical as illustrated in FIG. 11. The manipulator system 48 is also configured to press the oscillating preform rotor blades 28 (e.g., radially) against the rotor disk 22. More particularly, the manipulator system 48 is configured to press the weld constants 34 against the weld constants 40, which may cause the material of the weld constants 34 and 40 to melt and mix and thereby weld together.

The controller 50 is in signal communication (e.g., hardwired and/or wirelessly connected) with at least the manipulator system 48. The controller 50 may be implemented with a combination of hardware and software. The hardware may include memory and at least one processing device, which may include one or more single-core and/or multi-core processors. The memory is configured to store software (e.g., program instructions) for execution by the processing device, which software execution may control and/or facilitate performance of one or more operations such as those described in the methods below. The memory may be a non-transitory computer readable medium configured as or that includes a volatile memory and/or a nonvolatile memory. The hardware may also or alternatively include analog and/or digital circuitry other than that described above.

Figure 12:
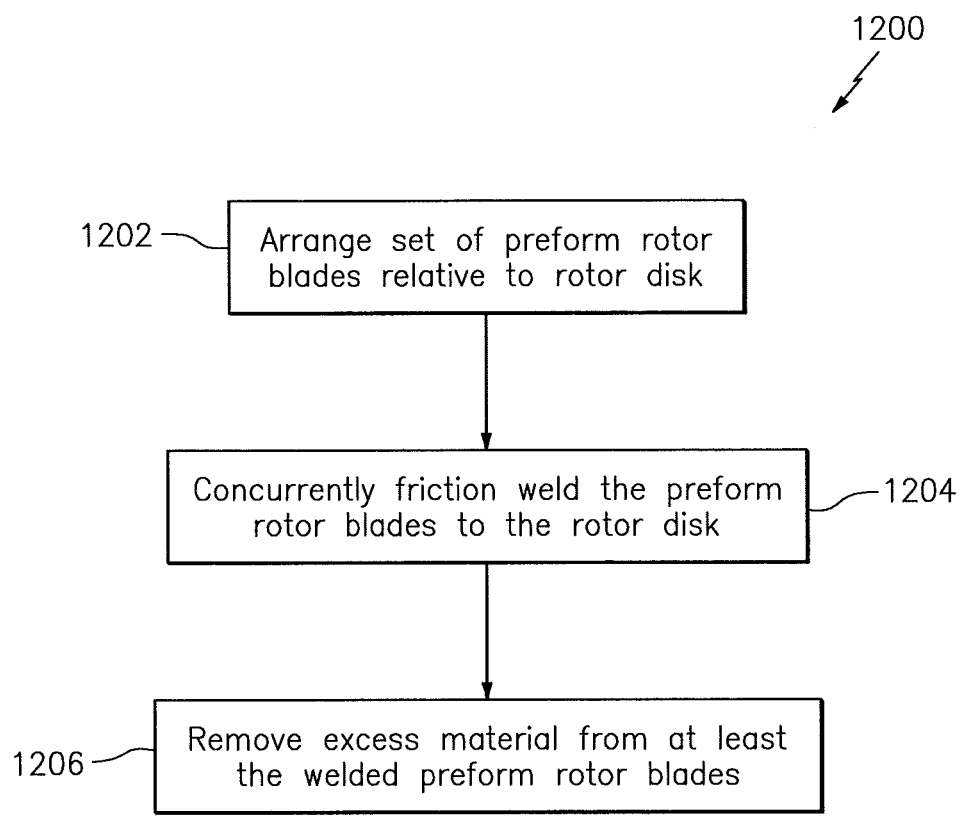
FIG. 12 is a flow diagram of a method for providing an integrally bladed rotor.

FIG. 12 is a flow diagram of a method 1200 for providing an integrally bladed rotor such as the rotor 20. This method 1200 may be utilized for manufacturing a new integrally bladed rotor. The method 1200 may also or alternatively be used for repairing a worn or damaged integrally bladed rotor. In such embodiments, a plurality of rotor blades may be at least partially removed (e.g., cut, machined, etc.) from the rotor disk 22, where at least one of these rotor blades may be damaged or worn. The preform rotor blades 28 may thereafter be friction welded to the rotor disk 22 using the method 1200 at locations from where the rotor blades were removed.

In step 1202, a set of preform rotor blades 28 are arranged relative to the rotor disk 22. The preform rotor blades 28, for example, may be secured with the rotor blade fixture 46. The rotor blade fixture 46 may then be arranged next to locations to which the preform rotor blades 28 are to be welded to the rotor disk 22; e.g., locations from which worn or damaged rotor blades were removed.

In step 1204, the preform rotor blades 28 are concurrently friction welded (e.g., linear friction welded) to the rotor disk 22. The manipulator system 48, for example, may be signaled by the controller 50 to oscillate the preform rotor blades 28 back and forth linearly along the weld plane 56 relative to the stationary rotor disk 22. The manipulator system 48 may also be signaled by the controller 50 to press the oscillating preform rotor blades 28 and, more particularly, the weld constants 40 against the stationary preform rotor blade bases 30 and, more particularly, the weld constants 34. Friction heat generated between the weld constants 34 and 40 may melt the material of the weld constants 34 and 40 and thereby mix the melted material together; i.e., friction weld the material together. The preform rotor blades 28 may be pressed against the rotor disk 22 until, for example, the collar 36 is adjacent (e.g., touches) or is welded to the rotor stubs 32.

In step 1206, excess material is removed from at least the welded preform rotor blades 28 and/or the preform rotor blade bases 30. Collar 36 material, stub 32 material, flash 34, 40 material, etc., for example, may be machined and/or otherwise removed to provide the rotor blades 24. Of course, the rotor blade 24 and/or rotor disk 22 material may also be heat treated or otherwise finished and/or manipulated.

In some embodiments, referring to FIGS. 3, 8 and 9, the collar 36 may be formed unitary with a plurality of the preform rotor blades 28. In some embodiments, referring to FIGS. 4 and 5, the collar 36 may include a plurality of discrete segments 38. Each of these collar segments 38 may be formed integral with a respective one of the preform rotor blades 28. The collar segments 38 may subsequently be interconnected together by bonding (e.g., welding, brazing, adhering, etc.) as illustrated in FIG. 4 and/or through a mechanical joint (e.g., a tongue and groove joint, fasteners, etc.) as illustrated in FIG. 5.

Figure 13:
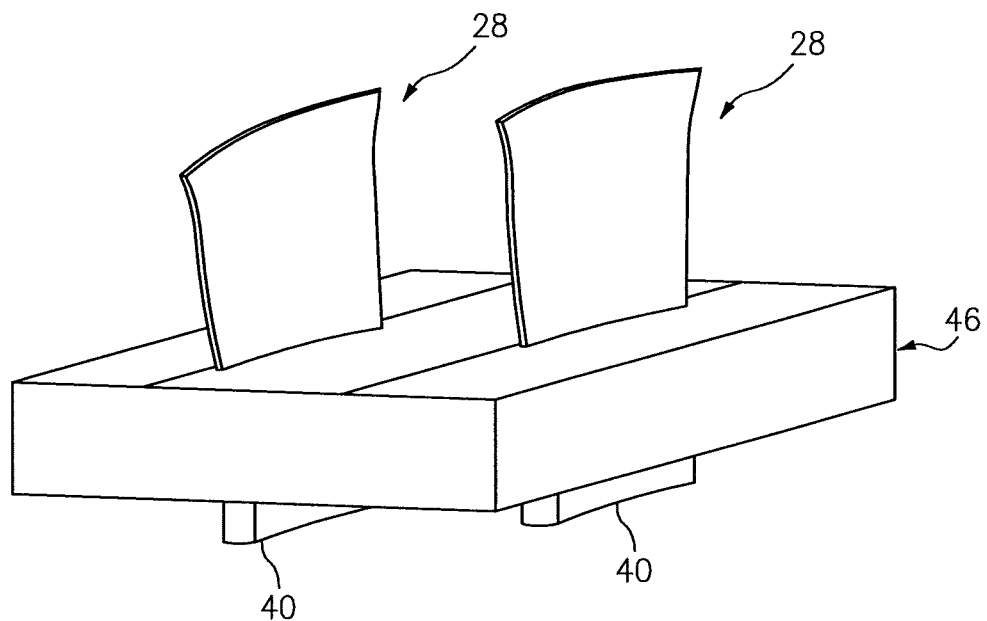
FIGS. 13 and 14 are illustrations of the preform rotor blades of FIG. 6 configured with a rotor blade fixture.
Figure 14:
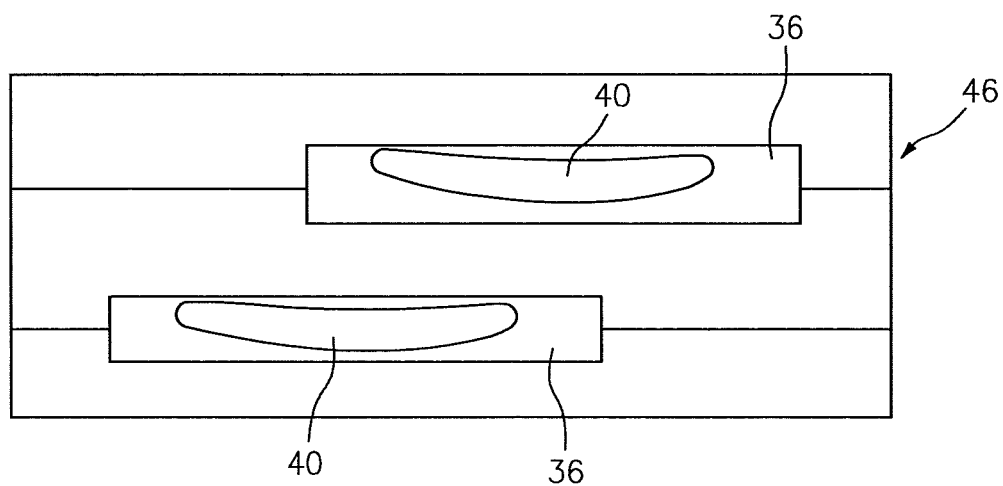

In some embodiments, referring to FIG. 6, each of the preform rotor blades 28 may be configured with its own respective collar 36. These collars 36 may then be functionally connected together by the rotor blade fixture 46 or another device as illustrated in FIGS. 13 and 14.

The foregoing methodology may also or alternatively be performed using one or more welding techniques other than that described above. Other suitable welding techniques may include, but not limited to, tungsten inert gas (TIG) welding, metal inert gas (MIG) welding, friction stir welding, etc. Furthermore, the foregoing methodology may be performed using other material bonding processes such as, but not limited to, adhesion. The method and apparatuses of the present disclosure therefore are not limited to any particular bonding techniques, but may be preferably performed using linear friction welding.

Figure 15:
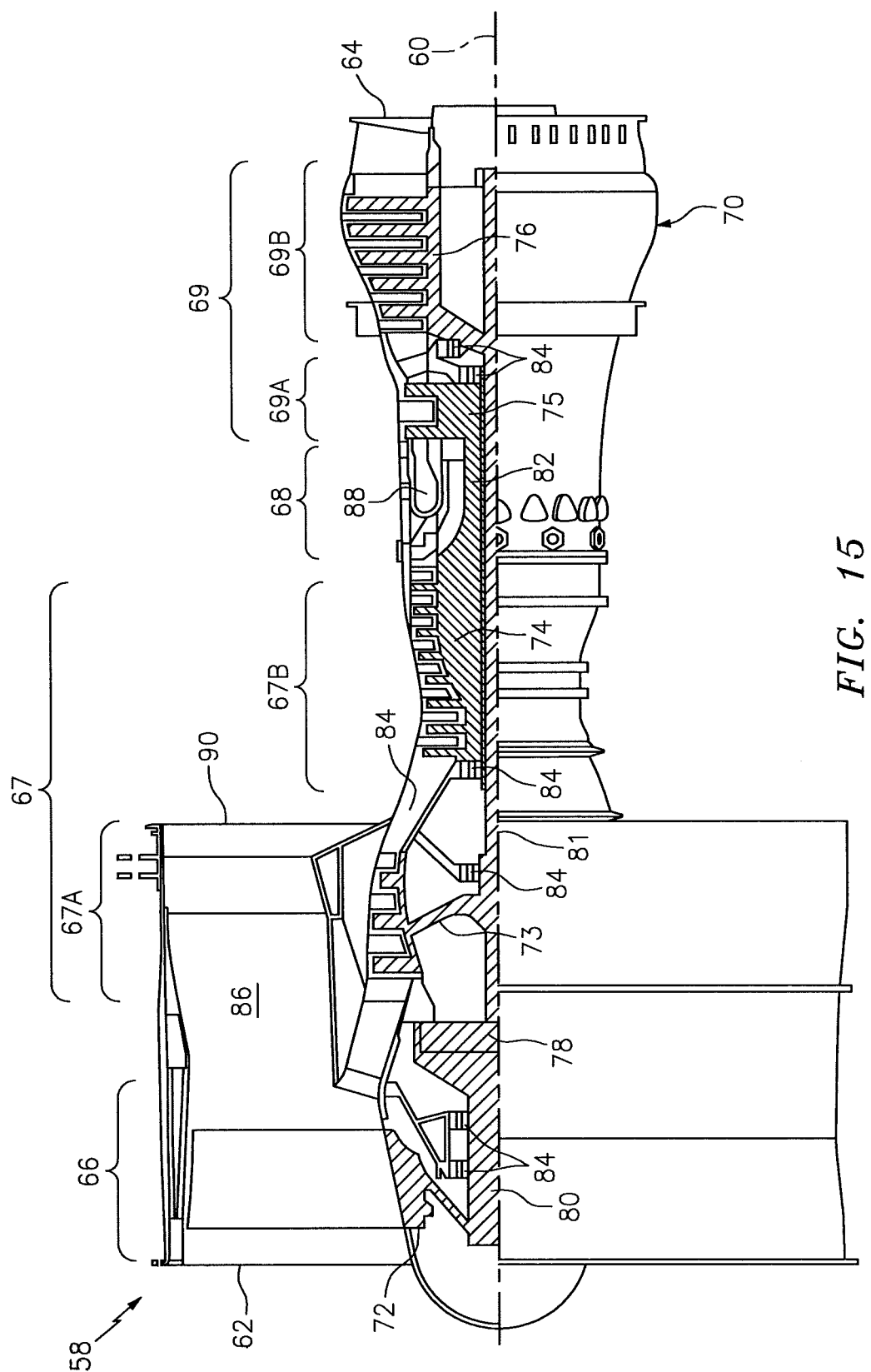
FIG. 15 is a side cutaway illustration of a geared turbine engine.

FIG. 15 is a side cutaway illustration of a geared turbine engine 58 with which an integrally blade rotor such as those described above may be configured. The turbine engine 58 extends along an axial centerline 60 between an upstream airflow inlet 62 and a downstream airflow exhaust 64. The turbine engine 58 includes a fan section 66, a compressor section 67, a combustor section 68 and a turbine section 69. The compressor section 67 includes a low pressure compressor (LPC) section 67A and a high pressure compressor (HPC) section 67B. The turbine section 69 includes a high pressure turbine (HPT) section 69A and a low pressure turbine (LPT) section 69B.

The engine sections 66-69 are arranged sequentially along the centerline 60 within an engine housing 70. Each of the engine sections 66, 67A, 67B, 69A and 69B includes a respective rotor 72-76, one or more of which may be configured as or include the rotor 20. Each of these rotors 72-76 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 72 is connected to a gear train 78, for example, through a fan shaft 80. The gear train 78 and the LPC rotor 73 are connected to and driven by the LPT rotor 76 through a low speed shaft 81. The HPC rotor 74 is connected to and driven by the HPT rotor 75 through a high speed shaft 82. The shafts 80-82 are rotatably supported by a plurality of bearings 84; e.g., rolling element and/or thrust bearings. Each of these bearings 84 is connected to the engine housing 70 by at least one stationary structure such as, for example, an annular support strut.

During operation, air enters the turbine engine 58 through the airflow inlet 62, and is directed through the fan section 66 and into a core gas path 84 and a bypass gas path 86. The air within the core gas path 84 may be referred to as "core air". The air within the bypass gas path 86 may be referred to as "bypass air". The core air is directed through the engine sections 67-69, and exits the turbine engine 58 through the airflow exhaust 64 to provide forward engine thrust. Within the combustor section 68, fuel is injected into a combustion chamber 88 and mixed with the core air. This fuel-core air mixture is ignited to power the turbine engine 58. The bypass air is directed through the bypass gas path 86 and out of the turbine engine 58 through a bypass nozzle 90 to provide additional forward engine thrust. Alternatively, at least some of the bypass air may be directed out of the turbine engine 58 through a thrust reverser to provide reverse engine thrust.

The rotor 20 may be included in various turbine engines other than the one described above as well as in other types of rotational equipment. The rotor 20, for example, may be included in a geared turbine engine where a gear train connects one or more shafts to one or more rotors in a fan section, a compressor section and/or any other engine section. Alternatively, the rotor 20 may be included in a turbine engine configured without a gear train. The rotor 20 may be included in a geared or non-geared turbine engine configured with a single spool, with two spools (e.g., see FIG. 15), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for providing an integrally bladed rotor, comprising:
    arranging a set of preform rotor blades relative to a rotor disk; and
    concurrently welding the preform rotor blades to the rotor disk;
    wherein the preform rotor blades are interconnected by at least one collar, and each of the preform rotor blades is integrally connected to the at least one collar.

2. The method of claim 1, wherein the welding comprises linear friction welding.

3. The method of claim 1, wherein a weld plane between preform rotor blades and the rotor disk is planar.

4. The method of claim 1, wherein a weld plane between the preform rotor blades and the rotor disk is parti-cylindrical.

5. The method of claim 1, wherein the at least one collar is a collar that is formed as a unitary, monolithic body with the preform rotor blades.

6. A method for providing an integrally bladed rotor, comprising:
    arranging a set of preform rotor blades relative to a rotor disk; and
    concurrently welding the preform rotor blades to the rotor disk;
    wherein the preform rotor blades are interconnected by a collar; and
    wherein the collar includes a plurality of collar segments, each of the collar segments is formed as a unitary body with a respective one of the preform rotor blades, and an adjacent pair of the collar segments are bonded together.

7. A method for providing an integrally bladed rotor, comprising:
    arranging a set of preform rotor blades relative to a rotor disk; and
    concurrently welding the preform rotor blades to the rotor disk;
    wherein the preform rotor blades are interconnected by a collar; and
    wherein the collar includes a plurality of collar segments, each of the collar segments is formed as a unitary body with a respective one of the preform rotor blades, and an adjacent pair of the collar segments are mechanically joined together.

8. The method of claim 1, wherein the collar includes at least one gripping feature.

9. The method of claim 1, wherein the at least one collar comprises a plurality of collars, each of the preform rotor blades is formed integral with a respective one of the collars, and the collars are interconnected by a fixture used to hold and move the preform rotor blades during the welding.

10. The method of claim 1, wherein the rotor disk includes a set of preform rotor blade bases to which the preform rotor blades are respectively welded.

11. The method of claim 1, wherein the welding comprises
    holding the rotor disk stationary;
    oscillating the preform in rotor blades along a weld plane; and
    pressing the oscillating preform rotor blades against the stationary rotor disk.

12. The method of claim 1, further comprising machining excess material from at least the welded preform rotor blades to respectively fowl a set of rotor blades.

13. The method of claim 12, wherein the rotor blades comprise compressor blades for a turbine engine.

14. The method of claim 12, wherein the rotor blades comprise turbine blades for a turbine engine.

15. The method of claim 12, wherein the rotor blades comprise fan blades for a turbine engine.

16. A method for providing an integrally bladed rotor for a turbine engine, comprising:
    arranging a set of preform rotor blades relative to a rotor disk, wherein the preform rotor blades are interconnected by at least one collar, and wherein the preform rotor blades are cast, forged and/or machined integral with the at least one collar;
    concurrently bonding the preform rotor blades to the rotor disk; and
    machining excess material from at least the bonded preform rotor blades to respectively form a set of blades for the turbine engine.

* * * * *

UNITED STATES PATENT AND TRADEMARK OFFICE
CERTIFICATE OF CORRECTION

PATENT NO. : 9,551,230 B2  
APPLICATION NO. : 14/622344  
DATED : January 24, 2017  
INVENTOR(S) : Jordan J. Franklin Page 1 of 1

It is certified that error appears in the above-identified patent and that said Letters Patent is hereby corrected as shown below:

In the Claims

Column 8, Line 22, please delete "perform in rotor" and insert --perform rotor--.

Column 8, Line 28, please delete "fowl" and insert --form--.

Signed and Sealed this  
Seventh Day of March, 2017

Michelle K. Lee  
*Director of the United States Patent and Trademark Office*